United States Patent [19]
Ohtake

[11] Patent Number: 5,993,877
[45] Date of Patent: Nov. 30, 1999

[54] METHOD OF MANUFACTURING COFFEE EXTRACT ALLOWING LONG-TERM PRESERVATION

[75] Inventor: Hiroyuki Ohtake, Tokyo, Japan

[73] Assignee: Unicafe Inc., Tokyo, Japan

[21] Appl. No.: 09/159,556

[22] Filed: Sep. 24, 1998

[30] Foreign Application Priority Data

Feb. 13, 1998 [JP] Japan ................... 10-048819

[51] Int. Cl.$^6$ ........................................ A23F 5/00
[52] U.S. Cl. .......................... 426/433; 426/271; 426/595
[58] Field of Search ................................... 426/595, 433, 426/271

[56] References Cited

U.S. PATENT DOCUMENTS

| | | | |
|---|---|---|---|
| 4,521,438 | 6/1985 | Zeller et al. | 426/271 |
| 5,853,787 | 12/1998 | Gurol | 426/595 |

FOREIGN PATENT DOCUMENTS

| | | |
|---|---|---|
| 61-74543 | 4/1986 | Japan . |
| 2-222647 | 9/1990 | Japan . |
| 6-292509 | 10/1994 | Japan . |
| 97/23139 | 7/1997 | WIPO . |

*Primary Examiner*—Anthony J. Weier
*Attorney, Agent, or Firm*—Dilworth & Barrese

[57] ABSTRACT

It is the object of the present invention to provide a coffee extract manufacturing method which prevents deterioration of flavor and precipitation in the coffee extract during long-term preservation and also keeps a sealed container filled with the coffee extract from expanding to deform or break for long preservation or heat sterilization. The invention is directed to a coffee extract manufacturing method allowing a long-term preservation, which has achieved the above object by adding strong alkaline salt that is alkaline noncarbonate into coffee extract.

28 Claims, No Drawings

METHOD OF MANUFACTURING COFFEE EXTRACT ALLOWING LONG-TERM PRESERVATION

BACKGROUND OF THE INVENTION

1. Field of the Invention

The present invention relates generally to a method of manufacturing a coffee extract allowing a long-term preservation, and more particularly to a coffee extract manufacturing method, allowing a long-term preservation of a coffee extract that has a high concentration of solid content and is diluted for drinking.

2. Description of the Related Art

Some components in coffee extract become insoluble and precipitate during long-term preservation. The amount of precipitation is especially large in coffee extract which has high concentration of solids content and is diluted for drinking, and this reduces the value of the product. This precipitation occurs even during refrigeration, and accelerates in ordinary temperature.

The precipitation of insoluble components in coffee extract proceeds from the decline of hydrogen ion exponent (pH), which causes not only precipitation or cloudiness in coffee extract but also deterioration of flavor accompanied with increase of sourness.

Therefore as a method of preventing this precipitation and deterioration of flavor, there has been proposed a manufacturing process containing addition of sodium hydrogen carbonate into coffee extract(Japanese Patent Laid-open Pub. Nos. 61-74543, 2-222647, 6-2925).

However, if coffee extract is filled into a sealed container, the use of a large quantity of alkaline carbonate, such as sodium hydrogen carbonate mentioned above, causes gas because of long preservation or heat sterilization with the result that the container expands to deform and break. The invention purposes to solve these problems and has achieved its purpose by the completion of the invention mentioned below.

SUMMARY OF THE INVENTION

The invention prevents the decline of hydrogen ion exponent of coffee extract resulted from long-term preservation and uses alkaline noncarbonate which does not produce gas causing expansion of a container. Adding alkaline noncarbonate into coffee extract prevents precipitation or deterioration of flavor resulting from long preservation, and if the coffee extract is filled into a sealed container, it also prevents occurrence of gas resulting from passage of time or heat sterilization which causes expansion, deformation, and breakage of the container.

This invention makes it possible to make a long-term preservation of coffee extract by adding strong alkaline salt that is alkaline noncarbonate to modulate hydrogen ion concentration in the coffee extract. The modulation of hydrogen ion concentration is to make it suitable to avoid precipitation in the coffee extract during long-term preservation, and its condition depends on soluble solids concentration (Bx) of the coffee extract. The hydrogen ion exponent(pH) in the coffee extract after sterilization and aseptic filling into a sealed container should be modulated to be 5.3 or above, and more preferably, 5.6 or above. This process makes it possible to prevent the decline of pH, which causes cloudiness precipitation, or deterioration of flavor in coffee extract during long-term preservation.

Either or both of sodium hydroxide and potassium hydroxide can be used as strong alkaline salt.

The invention also makes it possible to make a long-term preservation of coffee extract by replacing a part of strong alkaline salt with alkaline carbonate to modulate hydrogen ion concentration of the coffee extract. As alkaline carbonate to replace, sodium carbonate or sodium hydrogen carbonate (sodium bicarbonate) can be added, and its amount to add depends on the rate of the volume of the container and coffee extract or the length of preservation. For example, when coffee extract is filled to 80% by volume of the container and the rest 20% is empty, the amount of alkaline carbonate to add should be less than 0.5% by weight of the extract, and more preferably, less than 0.3% by weight.

This invention also makes it possible to make a long-term preservation of coffee extract by adding acid to remove precipitation before modulating hydrogen ion concentration of the coffee extract, and then, adding only strong alkaline salt or both strong alkaline salt and alkaline carbonate to modulate hydrogen ion concentration of the coffee extract.

Acid added before modulation of hydrogen ion concentration is carried for the purpose of removing the precipitation resulted from decline of pH in the coffee extract as much as possible beforehand, and it depends on soluble solids concentration as well as the modulation of hydrogen ion concentration mentioned above. Hydrogen ion exponent (pH) of the coffee extract filled into a container should be lowered by 0.05 at least, and preferably, by more than 0.1. This process can reduce the amount of precipitation that occurs during long preservation, and prevent decline of hydrogen ion exponent resulted from passage of time which brings deterioration of flavor and precipitation. This is because adding strong alkali to weak acid makes an environment which serves buffer action and the decline of pH in the coffee extract is restrained more effectively than the case of adding only strong alkali, with the result that precipitation becomes less likely occur.

As acid added before modulation of hydrogen ion concentration, not only organic acid such as citric acid, malic acid, or L-Ascorbic acid, but also inorganic acid such as phosphoric acid or hydrochloric acid, can be used alone or combined, but using organic acid is more preferable, when the flavor of coffee extract as a beverage product is emphasized.

Embodiment of the Invention

DESCRIPTION OF THE PREFERRED EMBODIMENTS

Embodiments of the present invention will now be described.

Coffee extract is can be obtained by extracting from roasted coffee beans with a desired method such as using cold, warm, or hot water. In this invention the method of extracting does not have to be limited and any method can be adopted. Therefore the following examples used coffee extract produced with hot water from roasted coffee beans.

First, in Experiment 1, to present comparable objects to judge the effect of the invention, following points: ① flavor ② deformation of container ③ precipitation: were evaluated about several kinds of coffee extract varying in the amount of sodium hydrogen carbonate added with the method of the prior art in order to preserve it for long. The evaluation above was done on both the one immediately after sterilization for preserving and the one after preservation.

Coffee extract to be evaluated was prepared through process of adding sodium hydrogen carbonate into coffee extract produced from roasted coffee beans with hot water, modulating soluble solids concentration (Bx) to be 15 degrees, sterilizing for 30 seconds at 135° C., filling aseptically 4000 g each into a 5l–1 BIB (Bag-In-Box) container composed of a plastic bag and a paper box, and preserving it for 30 days at 25° C. Coffee extract containing no sodium hydrogen carbonate was also prepared together.

In the evaluation of ① flavor, preserved coffee extract was diluted so that the soluble solids concentration is 1.5 degrees and evaluated on a scale of 5 points in which 5 is the highest point. In the evaluation of ② deformation of container, appearance of the container filled with the preserved coffee extract was observed, and evaluated with the following marks: ⊚no expansion of the inner bag recognized, ○expansion of the inner bag recognized but no deformation of the outer box, xdeformation of the outer box recognized. In the evaluation of ③ precipitation, 10 ml of the preserved coffee extract was put into a centrifugal tube and centrifuged for 10 minutes at 3000 rpm, and then evaluated with the following marks: ⊚no precipitation occurred, Δslight cloudiness occurred, xprecipitation occurred. Table 1 below shows the result.

TABLE 1

|  | amount of addition (wt %) | | | | |
| --- | --- | --- | --- | --- | --- |
| sodium hydrogen carbonate | 0.00 | 0.10 | 0.15 | 0.30 | 0.45 |
| pH before sterilization | 5.32 | 5.80 | 5.94 | 6.65 | 6.90 |
| pH right after sterilization | 4.97 | 5.38 | 5.52 | 5.80 | 5.89 |
| ① flavor | 2 | 4 | 5 | 5 | 5 |
| ② deformation of container | ⊚ | ⊚ | ⊚ | ⊚ | ⊚ |
| ③ precipitation | x | Δ | ○ | ○ | ○ |
| pH 30 days later | 4.76 | 4.88 | 5.06 | 5.34 | 5.48 |
| ① flavor | 1 | 2 | 3 | 4 | 4 |
| ② deformation of container | ⊚ | ⊚ | ○ | x | x |
| ③ precipitation | x | x | x | Δ | ○ |

The result shown in Table 1 indicates that adding sodium hydrogen carbonate prevents precipitation and deterioration of flavor accompanied by increase in sourness, while hydrogen ion exponent in normal coffee extract greatly decreases by long-term preservation or heat sterilization. On the other hand, however, it is recognized that a large amount of sodium hydrogen carbonate causes deformation of the container in long-term preservation.

Then, in Embodiment 1, other alkaline salt in stead of sodium hydrogen carbonate was added into coffee extract, and after preserved, the coffee extract was evaluated on the same points as in Experiment 1 mentioned above. Coffee extract to be evaluated was prepared through process of adding each alkaline salt to the coffee extract so that pH after sterilization is almost the same as the one containing 0.45 wt % sodium hydrogen carbonate of the extract, and then, in the same method of Experiment 1, modulating soluble solids concentration to be 15 degrees, sterilizing for 30 seconds at 135° C., filling aseptically 4000 g of the extract into a 5l–1 BIB container composed of a plastic bag and a paper box, and preserving it for 30 days at 25° C. The result is shown in Table 2.

TABLE 2

|  | amount of addition (wt %) | | | | |
| --- | --- | --- | --- | --- | --- |
| sodium hydrogen carbonate | 0.45 | — | — | — | — |
| sodium carbonate | — | 0.28 | — | — | — |
| sodium hydroxide | — | — | 0.21 | — | 0.12 |
| potassium hydroxide | — | — | — | 0.30 | 0.13 |

TABLE 2-continued

|  | amount of addition (wt %) | | | | |
| --- | --- | --- | --- | --- | --- |
| pH after sterilization | 5.89 | 5.84 | 5.79 | 5.76 | 5.80 |
| pH 30 days later | 5.48 | 5.45 | 5.46 | 5.44 | 5.45 |
| ① flavor | 4 | 4 | 4 | 4 | 4 |
| ② deformation of container | x | x | ⊚ | ⊚ | ○ |
| ③ precipitation | ○ | ○ | ○ | ○ | ○ |

The result shown in Table 2 indicates that adding sodium carbonate, which is alkaline salt, prevents precipitation and deterioration of flavor as well as sodium hydrogen carbonate, while the container severely deformed and broke in this case. However, in case of adding sodium hydroxide or potassium hydroxide or both, which are strong alkaline salt, precipitation and deterioration of flavor were prevented, and moreover, there was less expansion of the bag and no influence on the outer box. This result proved that the use of strong alkaline salt can prevent precipitation and deterioration of flavor, and besides, solve the problem of deformation of a container.

Next, in Embodiment 2, a part of sodium hydroxide and potassium hydroxide added into coffee extract, which are alkaline salt that brought preferable result in Embodiment 1 above, was replaced with sodium hydrogen carbonate, and this coffee extract was evaluated on the same points as in Embodiment 1 with the amount of sodium hydroxide or potassium hydroxide and sodium hydrogen carbonate varied. Each alkaline salt and sodium hydrogen carbonate was added into the coffee extract so that hydrogen ion exponent after sterilization is about the same as the one containing 0.45 wt % sodium hydrogen carbonate, as in Embodiment 1, and except for that, all conditions and method to prepare coffee extract were the same as in Embodiment 1 above. Table 3 below shows the result.

TABLE 3

|  | amount of addition (wt %) | | | | | |
| --- | --- | --- | --- | --- | --- | --- |
| sodium hydrogen carbonate | 0.45 | 0.13 | 0.24 | 0.34 | 0.13 | 0.34 |
| sodium hydroxide | — | 0.15 | 0.10 | 0.05 | — | — |
| potassium hydroxide | — | — | — | — | 0.21 | 0.07 |
| pH after sterilization | 5.89 | 5.77 | 5.81 | 5.78 | 5.79 | 5.80 |
| pH 30 days later | 5.48 | 5.42 | 5.45 | 5.44 | 5.43 | 5.43 |
| ① flavor | 4 | 4 | 4 | 4 | 4 | 4 |
| ② deformation of container | x | ⊚ | ○ | x | ⊚ | x |
| ③ precipitation | ○ | ○ | ○ | ○ | ○ | ○ |

The result shown in Table 3 indicates that in case of replacing a part of sodium hydroxide or potassium hydroxide with sodium hydrogen carbonate, precipitation and deterioration of flavor are prevented and there is no influence on deformation of the container, as well as the case of using sodium hydroxide or potassium hydroxide or both. On the other hand, in case of adding 0.34% sodium hydrogen carbonate into the coffee extract, the container severely deformed and its outer box broke. According to this result, the desirable rate of strong alkaline salt such as sodium hydroxide or potassium hydroxide replaced with sodium hydrogen carbonate is less than 0.34% by weight of coffee extract, preferably about 0.24% by weight, and more preferably about 0.13% by weight.

Next, in Embodiment 3, citric acid, which is organic acid, was added into coffee extract before modulating hydrogen ion concentration by strong alkaline salt and then after removing precipitation in the coffee extract, modulation of hydrogen ion concentration by strong alkaline salt was done.

This extract was evaluated on the same points as in Embodiment 1 with the amount of citric acid to add varied. Coffee extract to be evaluated was prepared through process of adding necessary amount of citric acid into the coffee extract to lower hydrogen ion exponent by the required amount, leaving it for a while, removing precipitation by centrifugation, adding sodium hydroxide to make pH after sterilization 5.8, modulating soluble solids concentration to be about 25 degrees, sterilizing for 30 seconds at 135° C., filling aseptically 4000 g into a 5l–1 BIB container, and then preserving it at 25° C. for 30, 60, or 90 days. For Experiment 2, coffee extract into which no acid was added, was also prepared together. The result is shown in Table 4.

TABLE 4

| pH decline by citric acid addition | — | 0.05 | 0.10 | 0.20 |
|---|---|---|---|---|
| pH after addition of sodium hydroxide | 5.81 | 5.80 | 5.80 | 5.81 |
| pH 30 days later | 5.50 | 5.54 | 5.57 | 5.62 |
| ① flavor | 4 | 5 | 5 | 5 |
| ② deformation of container | ⊚ | ⊚ | ⊚ | ⊚ |
| ③ precipitation | Δ | ○ | ○ | ○ |
| pH 60 days later | 5.23 | 5.32 | 5.38 | 5.49 |
| ① flavor | 3 | 4 | 5 | 5 |
| ② deformation of container | ⊚ | ⊚ | ⊚ | ⊚ |
| ③ precipitation | x | Δ | ○ | ○ |
| pH 90 days later | 5.10 | 5.22 | 5.30 | 5.41 |
| ① flavor | 2 | 3 | 4 | 5 |
| ② deformation of container | ⊚ | ⊚ | ⊚ | ⊚ |
| ③ precipitation | x | x | Δ | ○ |

The result shown in Table 4 indicates that adding citric acid before modulating hydrogen ion concentration by strong alkaline salt prevents deterioration of flavor and deformation of container as well as precipitation during preservation. However, because too small amount of acid added to lower pH enough may not prevent precipitation resulting from long-term preservation, it is necessary to add enough amount of acid to lower pH in coffee extract by about 0.05 in case of 30-day preservation, by about 0.10 in case of 60-day preservation, and by about 0.20 in case of 90-day preservation, for keeping the extract stable.

Next, in Embodiment 4, organic acid used in Embodiment 3 was changed from citric acid to L-Ascorbic acid, and the evaluation about the coffee extract was done on the same points and in the same method to prepare coffee extract as in Embodiment 3. The result is shown in Table 5 below.

TABLE 5

| pH decline by L-Ascorbic acid addition | — | 0.05 | 0.10 | 0.20 |
|---|---|---|---|---|
| pH after addition of sodium hydroxide | 5.81 | 5.78 | 5.80 | 5.80 |
| pH 30 days later | 5.50 | 5.55 | 5.59 | 5.64 |
| ① flavor | 4 | 5 | 5 | 5 |
| ② deformation of container | ⊚ | ⊚ | ⊚ | ⊚ |
| ③ precipitation | Δ | ○ | ○ | ○ |
| pH 60 days later | 5.23 | 5.34 | 5.39 | 5.48 |
| ① flavor | 3 | 4 | 5 | 5 |
| ② deformation of container | ⊚ | ⊚ | ⊚ | ⊚ |
| ③ precipitation | x | Δ | ○ | ○ |
| pH 90 days later | 5.10 | 5.23 | 5.31 | 5.39 |
| ① flavor | 2 | 3 | 4 | 5 |
| ② deformation of container | ⊚ | ⊚ | ⊚ | ⊚ |
| ③ precipitation | x | x | Δ | ○ |

The result shown in Table 5 indicates that the same level of effect on each point of flavor, deformation of container, and precipitation is recognized if organic acid added before modulation of hydrogen ion concentration by strong alkaline salt is changed from citric acid to L-Ascorbic acid.

In addition, in Embodiment 5, citric acid that is organic acid was added into coffee extract before modulating hydrogen ion concentration in the coffee extract by strong alkaline salt, and then after removing precipitation, hydrogen ion concentration was modulated using both strong alkaline salt and sodium hydrogen carbonate. This coffee extract was evaluated on the same points as in Embodiment 3 with the amount of sodium hydrogen carbonate varied. Coffee extract to be evaluated was prepared through process of adding citric acid into coffee extract to lower pH by about 0.4, leaving it for a while, removing precipitation by centrifugation, adding required amount of sodium hydroxide to make pH after sterilization 6.0, modulating soluble solids concentration to be 20 degrees, sterilizing for 30 seconds at 135° C., filling 4000 g aseptically into a 5l–1 BIB container, and preserving it at 25° C. for 30, 60, or 90 days. For Experiment 3, coffee extract, in which no acid was added, was also prepared together with the amount of sodium hydrogen carbonate to add varied. [Table 6] below shows the result.

TABLE 6

| amount of addition of sodium hydrogen carbonate (wt %) | \multicolumn{5}{c}{no citric acid added} |||||
|---|---|---|---|---|---|
| | 0.00 | 0.10 | 0.20 | 0.30 | 0.50 |
| pH 30 days later | 5.51 | 5.52 | 5.50 | 5.51 | 5.50 |
| ① flavor | 4 | 4 | 4 | 4 | 4 |
| ② deformation of container | ⊚ | ○ | ○ | x | x |
| ③ precipitation | Δ | Δ | Δ | Δ | Δ |
| pH 60 days later | 5.25 | 5.25 | 5.23 | 5.24 | 5.25 |
| ① flavor | 3 | 3 | 3 | 3 | 3 |
| ② deformation of container | ⊚ | ○ | x | x | x |
| ③ precipitation | x | x | x | x | x |
| pH 90 days later | 5.14 | 5.14 | 5.13 | 5.14 | 5.14 |
| ① flavor | 2 | 2 | 2 | 2 | 2 |
| ② deformation of container | ⊚ | ○ | x | x | x |
| ③ precipitation | x | x | x | x | x |
| amount of addition of sodium hydrogen carbonate (wt %) | \multicolumn{5}{c}{citric acid added} |||||
| | 0.00 | 0.10 | 0.20 | 0.30 | 0.50 |
| pH 30 days later | 5.74 | 5.75 | 5.75 | 5.73 | 5.74 |
| ① flavor | 5 | 5 | 5 | 5 | 5 |
| ② deformation of container | ⊚ | ⊚ | ⊚ | ○ | ○ |
| ③ precipitation | ○ | ○ | ○ | ○ | ○ |
| pH 60 days later | 5.60 | 5.60 | 5.59 | 5.58 | 5.60 |
| ① flavor | 5 | 5 | 5 | 5 | 5 |
| ② deformation of container | ⊚ | ⊚ | ○ | ○ | ⊚ |
| ③ precipitation | ○ | ○ | ○ | ○ | ○ |
| pH 90 days later | 5.55 | 5.57 | 5.56 | 5.55 | 5.53 |
| ① flavor | 4 | 4 | 4 | 4 | 4 |
| ② deformation of container | ⊚ | ⊚ | ○ | ○ | x |
| ③ precipitation | ○ | ○ | ○ | ○ | ○ |

The result shown in Table 6 indicates that deterioration of flavor, deformation of container and precipitation in coffee extract during preservation are avoided as well as in Embodiment 3, when citric acid that is organic acid is added into the coffee extract before modulating hydrogen ion concentration by strong alkaline salt and after removing precipitation, hydrogen ion concentration is modulated by both strong alkaline salt and sodium hydrogen carbonate. Moreover, in case of adding 0.34 wt % sodium hydrogen carbonate into coffee extract in Embodiment 2, even the container of 30-day preservation severely deformed and the outer box broke, while in case of adding citric acid to remove precipitation in coffee extract, coffee extract added 0.30 wt % sodium hydrogen carbonate could resist 90-day preservation, and the one added 0.50 wt % sodium hydrogen carbonate could resist 60-day preservation though soluble solids concentration (Bx) was higher than the case of Embodiment 2. This result proved that deformation of container is avoided if citric acid is added to remove precipitation before modulation of hydrogen ion concentration by strong alkaline salt, though more sodium hydrogen carbonate is added together than the case of adding no citric acid.

Effect of the Invention

The above mentioned that the invention enabled long-term preservation of coffee extract by adding strong alkaline salt to prevent precipitation and deterioration of flavor. Moreover, with this method, a sealed container filled with the coffee extract dose not expand to deform or break, because gas resulted from passage of time or heat sterilization will not occur as will do when alkaline salt carbonate is used.

Besides, the invention enables easier operation of modulating toward desirable hydrogen ion concentration by using both strong alkaline salt and alkaline salt carbonate together, which realizes milder modulation of hydrogen ion concentration of coffee extract than using only strong alkaline salt.

In addition, the invention enabled long-term preservation of coffee extract by adding acid before modulation of hydrogen ion concentration by strong alkaline salt to prevent precipitation still more. Moreover, in the invention, addition of acid accompanied with alkali is possible, because this addition of acid is carried on the basis of the invention that modulation of hydrogen ion concentration is done by strong alkaline and therefore gas will not occur during the modulation, as will do if acid is added on the basis of the prior method that modulation is done by carbonate.

What is claimed is:

1. A coffee extract manufacturing method comprising the step of adding a strong alkaline salt to a coffee extract to modulate hydrogen ion concentration, in an amount to prevent precipitation or deterioration of the flavor resulting from long preservation and, at the same time, when said extract is filled into a sealed container, preventing occurrence of gas resulting from passage of time or heat sterilization which can cause expansion, deformation and breakage of the container.

2. A coffee extract manufacturing method according to claim 1, wherein strong alkaline salt added is either or both of sodium hydroxide and potassium hydroxide.

3. A coffee extract manufacturing method according to claim 1, wherein a part of strong alkaline salt added is replaced with alkaline carbonate.

4. A coffee extract manufacturing method according to claim 1, wherein an acid is added to create precipitate-forming conditions followed by removal of precipitates before modulating hydrogen ion concentration.

5. A coffee extract manufacturing method according to claim 2, wherein a part of strong alkaline salt added is replaced with alkaline carbonate.

6. A coffee extract manufacturing method according to claim 2, wherein an acid is added to create precipitate-forming conditions followed by removal of precipitates before modulating hydrogen ion concentration.

7. A coffee extract manufacturing method according to claim 3, wherein an acid is added create precipitate-forming conditions followed by removal of precipitates before modulating hydrogen ion concentration.

8. A coffee extract manufacturing method to claim 5, wherein an acid is added to create precipitate-forming conditions followed by removal of precipitates before modulating hydrogen ion concentration.

9. A coffee extract manufacturing method according to claim 1, comprising the additional step of modulating the hydrogen ion concentration to pH 5.3 or above.

10. A coffee extract manufacturing method according to claim 9, wherein the hydrogen ion concentration is modulated to pH 5.6 or above.

11. A coffee extract manufacturing method according to claim 3, wherein the alkaline carbonate is sodium carbonate or sodium bicarbonate.

12. A coffee extract manufacturing method according to claim 11, wherein the amount of alkaline carbonate added is less than about 0.5% by weight of the extract.

13. A coffee extract manufacturing method according to claim 12, wherein the amount of alkaline carbonate added is less than about 0.3% by weight of the extract.

14. A coffee extract manufacturing method according to claim 1, wherein only the strong alkaline salt is added.

15. A coffee extract manufacturing method according to claim 3, wherein only a combination of the strong alkaline salt and alkaline carbonate is added.

16. A coffee extract manufacturing method according to claim 4, wherein the acid is added in an amount to prevent precipitation resulting from subsequent long-term preservation.

17. A coffee extract manufacturing method according to claim 16, wherein an amount of the acid is added to lower the pH by at least about 0.05.

18. A coffee extract manufacturing method according to claim 17, wherein an amount of the acid is added to lower the pH by at least about 0.1.

19. A coffee extract manufacturing method according to claim 18, wherein an amount of the acid is added to lower the pH by at least about 0.20.

20. A coffee extract manufacturing method according to claim 4, wherein the acid is organic acid selected from the group consisting of citric acid, malic acid, L-ascorbic acid and mixtures thereof, or inorganic acid selected from the group consisting of phosphoric acid, hydrochloric acid, and mixtures thereof, individually or in any combination of the above acids.

21. A coffee extract manufacturing method according to claim 1, comprising the additional step of sealing the extract in a sealed container whereby deformation of the container is prevented upon long-term storage.

22. A coffee extract manufacturing method according to claim 21, wherein, after the packaging of the extract in a sealed container, flavor is preserved, no precipitation occurs and no deformation occurs after 30 days of storage.

23. A coffee extract manufacturing method according to claim 22, wherein, after packaging in a sealed container, flavor is preserved, no precipitation occurs and no deformation occurs after 60 days of storage.

24. A coffee extract manufacturing method according to claim 23, wherein, after packaging in a sealed container, flavor is preserved, no precipitation occurs and no deformation occurs after 90 days of storage.

25. A coffee extract manufacturing method according to claim 3, wherein the strong alkaline salt is replaced with an amount of alkaline carbonate less than about 0.34% by weight of the extract.

26. A coffee extract manufacturing method according to claim 25, wherein the amount of the alkaline carbonate is less than about 0.24% by weight of the extract.

27. A coffee extract manufacturing method according to claim 26 wherein the amount of the alkaline carbonate is less than about 0.13% by weight of the extract.

28. A coffee extract manufacturing method according to claim 8, wherein the acid is citric acid and the alkaline carbonate is sodium carbonate or sodium bicarbonate.

* * * * *